United States Patent
Gute

[15] 3,659,308
[45] May 2, 1972

[54] COMBINED FINGER PUMP AND VALVE CONTROL FOR A TAILGATE WINDOW CLEANING SYSTEM

[72] Inventor: Loren R. Gute, Dayton, Ohio
[73] Assignee: General Motors Corporation, Detroit, Mich.
[22] Filed: Dec. 7, 1970
[21] Appl. No.: 95,693

[52] U.S. Cl. ............................15/250.02, 15/250.3, 60/60, 417/571
[51] Int. Cl. ..........................................B60s 1/48
[58] Field of Search ..................15/250.01, 250.02, 250.03, 15/250.04, 250.1, 250.12, 250.3; 60/60; 417/571

[56] References Cited

UNITED STATES PATENTS

| | | | |
|---|---|---|---|
| 3,076,220 | 2/1963 | Bitzer | 15/250.02 |
| 3,131,640 | 5/1964 | Rohde et al. | 15/250.02 X |
| 3,151,460 | 10/1964 | Bitzer et al. | 60/60 |

FOREIGN PATENTS OR APPLICATIONS 219,015 11/1958 Australia .......................15/250.02

Primary Examiner—Peter Feldman
Attorney—W. E. Finken and W. A. Schuetz

[57] ABSTRACT

In a preferred form, this disclosure relates to a combined manually actuatable washer pump and control means for controlling operation of a washer and wiper unit of a tailgate window cleaning system for a station wagon vehicle. The combined washer pump and control means comprises a depressible pumping element and a manually manipulatable actuating means including a pair of serially arranged plungers for controlling communication between a pressure source and a fluid motor of the wiper unit and for depressing the pump to initiate washer unit operation. The actuating means is constructed and arranged such that partial depression thereof will cause the plungers to move relative to each other to effect wiper unit operation alone and full depression thereof will cause conjoint energization of the wiper and washer units.

4 Claims, 7 Drawing Figures

PATENTED MAY 2 1972

INVENTOR.
Loren R. Gute

BY

W.A. Schuetz

ATTORNEY

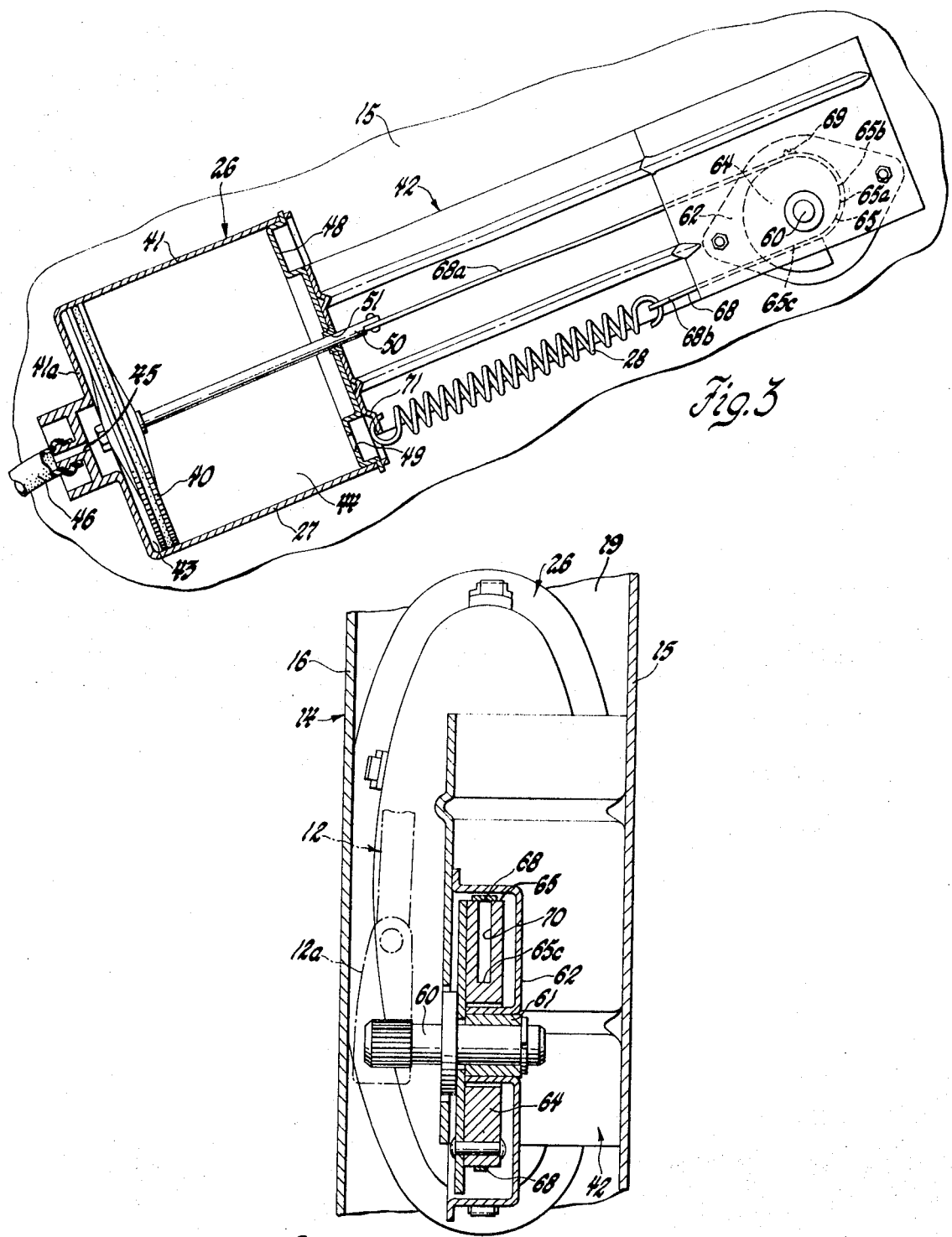

INVENTOR.
Loren R. Gute
BY
W. A. Schuetz
ATTORNEY

COMBINED FINGER PUMP AND VALVE CONTROL FOR A TAILGATE WINDOW CLEANING SYSTEM

The present invention relates to a combined manually actuatable pump and control means for controlling operation of a washer and wiper unit of a window cleaning system for a station wagon vehicle.

An object of the present invention is to provide a new and improved manually actuatable combined washer pump and control means for controlling operation of the pump of a window washer unit and for controlling operation of a fluid motor of a wiper unit for an automotive vehicle, and wherein the control means is of a relatively compact and economical construction and functions to only actuate the fluid motor of the wiper unit upon being partially depressed and to conjointly effect operation of the washer and wiper units when fully depressed.

Another object of the present invention is to provide a novel combined manually actuatable washer pump and valve control means for controlling operation of a washer unit and wiper unit of a window cleaning system for an automotive vehicle and which includes a housing, a pump means having a depressible pumping element carried by the housing, spaced inlet and outlet ports in the housing which are adapted to be in communication with a fluid pressure source and a fluid motor of the wiper unit, and an actuator means including a pair of serially arranged plungers, and in which the actuator means when partially depressed causes the plungers to move relative to each other to unblock communication between the inlet and outlet ports to effect operation of the wiper unit alone and when fully depressed causes the plungers to move in unison to unblock communication between the inlet and outlet ports and depress the pumping element to pump washer fluid under pressure to a washer nozzle.

A further object of the present invention is to provide a new and improved combined pump and valve control means as defined in the next preceding object, and in which one of the plungers is slidably supported by, but sealingly engaged with, the housing and in engagement with the depressible pumping element and the other of the plungers has a first deflectable portion in engagement with the one plunger and a second deflectable portion which is normally spaced from the first plunger to communicate the outlet with the atmosphere via an opening in the first plunger, and wherein the actuator means includes an actuator rod connected to the other plunger and slidably received within the one plunger so that when the actuator rod is partially depressed the first deflectable portion of the other plunger deflects to allow the other plunger to move relative to the one plunger to unblock communication between the inlet and outlet ports and the second deflectable portion to deflect to block communication between the outlet port and the atmosphere, and so that when the actuator rod is further depressed it is caused to bottom against the one plunger to effect depression of the pump element.

A still further object of the present invention is to provide a new and improved combined pump and valve control means as defined in the next preceding object and wherein the first deflectable portion comprises a resilient inner skirt which deflects laterally or bows when the first plunger is depressed and the second deflectable portion comprises an outer laterally deflectable skirt which laterally deflects to engage the housing when the other plunger is partially depressed and sealingly engages the one plunger when being fully depressed to block communication between the outlet port and the atmosphere.

The present invention further resides in various novel constructions and arrangement of parts, and further objects, novel characteristics and advantages of the present invention will be apparent to those skilled in the art to which it relates and from the following detailed description of the illustrated embodiment thereof made with reference to the accompanying drawings forming a part of this specification and in which similar reference numerals or characters are employed to designate corresponding parts throughout the several views, and in which:

FIG. 3 is a view similar to FIG. 2 but showing different parts thereof in different positions;

FIG. 4 is an enlarged sectional view taken approximately along lines 4—4 of FIG. 2;

The present invention provides a novel, manually actuatable, pump and control means 10 for a washer and wiper unit of a window cleaning system for an automotive vehicle. Although the novel pump and control means 10 could be used in various types of window cleaning systems for cleaning various windows of an automotive vehicle, it is particularly susceptible for use in a tailgate window cleaning system A for a station wagon vehicle 11 and in which the window cleaning system A includes a wiper 12 which is power actuated through its outboard stroke and spring actuated through its inboard stroke. Accordingly, for the purposes of description and illustration, the novel pump and control means will be herein described as being used in the latter type of window cleaning system.

Figure 1:
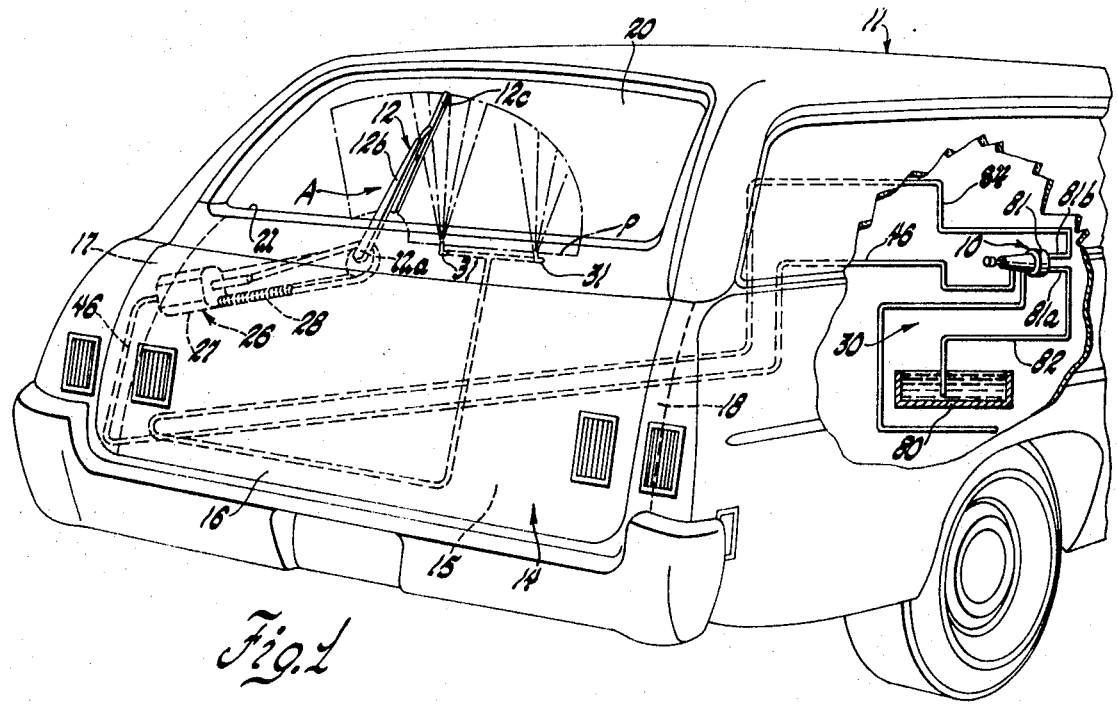
FIG. 1 is a fragmentary rear perspective view of a station wagon vehicle having a window cleaning system embodying the novel combined pump and control means of the present invention.

Referring to the drawings, the window cleaning system A is shown embodied in a station wagon vehicle 11. The station wagon 11 includes a conventional tailgate 14 which is supported on hinges (not shown) so as to enable the same to be swung from a generally vertical position, as shown in FIG. 1, to a generally horizontal position as well as enable the same to be swung about its left side edge between a closed position, as shown in FIG. 1, and an open position. The tailgate 14 includes inner, outer and side panels 15–18, respectively, which define a compartment 19. The tailgate 14 also carries a rear tailgate window 20 which is supported therein for movement between a closed position, as shown in FIG. 1, and an open position in which the window is disposed within the compartment 19. The tailgate window 20 is spaced from the outer panel 16 so as to define an elongated slot 21 extending transversely across the tailgate 14 at its upper end.

The window cleaning system A comprises, in general, a wiper unit which includes the window wiper 12 which is oscillatable through outboard and inboard strokes across the outer surface of the window 20; a drive means 26 having a fluid motor 27 for moving the wiper through its outboard stroke and a spring means 28 for moving the wiper through its inboard stroke during each cycle of operation; a washer unit 30 having a pair of washer nozzles 31 for delivering washer fluid against the outer surface of a tailgate window 20; and the combined washer pump and control means 10 for pumping washer fluid under pressure to the washer nozzles 31 and for controlling operation of the fluid motor 27 of the wiper unit. The combined pump and valve control means 10 effects wiper operation alone when partially depressed and effects conjoint operation of the wiper unit and the washer unit when fully depressed.

The windshield wiper 12 can be of any suitable or conventional construction and is hereshown as comprising a wiper arm having spring hinged connected inner and outer sections 12a and 12b for biasing a wiper blade assembly 12c carried by the outer arm section 12b against the outer surface of the tailgate window 20.

The window cleaning system A does not, per se, comprise a part of the present invention and is identical, except for the novel pump and control means, to the window cleaning system disclosed in co-pending application, Ser. No. 84,310 entitled "Demand Vacuum Actuated Tailgate Wiper System," filed Oct. 27, 1970 by George W. Jackson and Loren R. Gute, and assigned to the General Motors Corporation.

The window wiper 12 is adapted to be oscillated through its cycle of operation by the drive means 26. The window wiper 12 is power operated through its outboard stroke by the fluid motor 27 and is spring actuated through its inboard stroke by a spring means 28 during each cycle of operation. The windshield wiper 12 is in its park position P within the slot 21 to conceal the same from view when in its inboard stroke end position.

The fluid motor 27 of the drive means 26 is the vacuum operated motor and comprises a reciprocable piston 40 which is slidably received within a complementary shaped housing 41. The piston 40 divides the housing 41 into head end and rod end chambers 43 and 44. The housing 41 is suitably secured to a bracket means 42, the bracket means 42 in turn being suitably secured to the inner wall 15 of the vehicle tailgate 14. The piston 40 and the housing 41 are generally elliptical or oval, as viewed in cross section, so that the housing 41 will fit between the inner and outer walls 15 and 16 of the tailgate and yet have a piston area which is large enough to effect movement of the windshield wipers through its outboard stroke when vacuum pressure is communicated to the head end chamber 43 of the housing 41.

The housing 41 has an integral end wall 41a provided with an inlet 45 which is in constant communication with the head end chamber 43 and the combined control means 10 via a flexible conduit 46. The housing 41 also has a right end wall 48 which is suitably secured thereto and which is provided with an aperture 49 for venting the rod end chamber 44 to the atmosphere. Connected to the piston 40 is a piston rod 50 which extends through an aperture 51 in the end wall 48 of the housing 41.

The drive means 26 further includes an oscillatable drive pivot 60 to which the wiper 12 is secured. The drive pivot 60 is rotatably supported by a bushing 61 carried by a bracket or housing 62. The housing 62 is suitably secured to the bracket means 42. The drive means 60 at its left end, as viewed in FIG. 4, has a knurled end to which the inner arm section 12a of the wiper 12 is non-rotatably attached. Secured to the drive pivot 60 intermediate the ends of the latter is a reel 64 having an outer peripheral surface 65. A flexible means in the form of a flat metallic tape 68 extends partially around the outer peripheral surface 65 of the reel 64. The tape 68 intermediate its ends is secured to the reel 64 via a screw 69 and has its opposite ends suitably secured to the piston rod 50 and to one end of the spring means 28. The outer peripheral surface 65 of the reel 64 has a first portion 65a which is concentric with the rotatable axis of the drive pivot 60 and a second portion 65b whose radius progressively decreases proceeding from the portion 65a toward a chordal or tangential portion 65c which defines a flat surface. The flat surface 65c is defined by a radially extending slot 70 in a portion of the reel 64. The tape has an upper portion 68a, as viewed in FIG. 2, which is wider than the slot 70 and a lower portion 68b having a width which is less than the width of the slot, and for reasons to be noted hereinafter.

Figure 2:
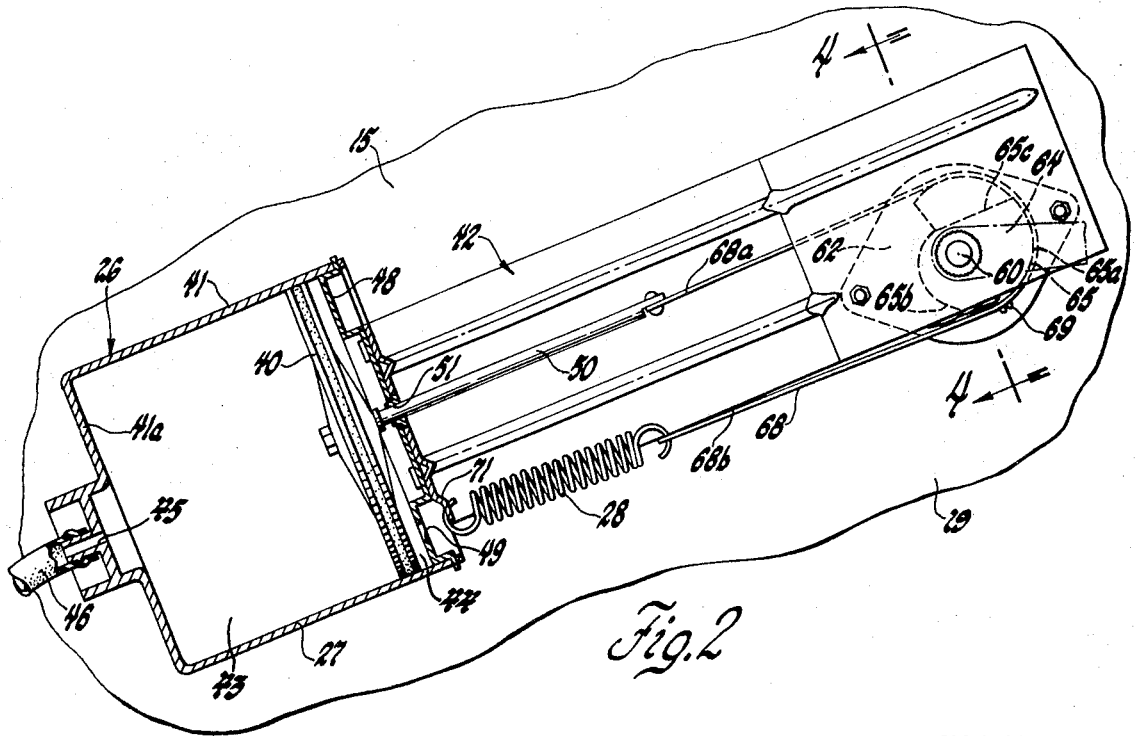
FIG. 2 is an enlarged fragmentary elevational view with parts shown in section of part of the window cleaning system shown in FIG. 1.

The piston 40 and the reel 64 are at all times biased toward the position shown in FIG. 2 by the spring means 28. The spring means is in the form of a tension spring having one end connected to the tape 68 and its other end secured to an ear 71 on the end wall of the housing 41. The spring means 28 urges the reel in a clockwise direction which in turn pulls on the piston rod 50 to tend to move the piston 40 toward the right, as viewed in FIG. 2. In this position the wiper 12 which is drivingly connected to the drive pivot 60 is in its inboard or park position in which the wiper 12 is disposed within the slot 21 adjacent the upper end of the tailgate 14.

The wiper 12 is moved through its outboard stroke when vacuum pressure from a vacuum source, preferably the inlet manifold of the vehicle, is communicated to the head end chamber 43 of the housing 41. When vacuum pressure is applied to the chamber 43 the piston 40 is caused to be moved toward the left, which in turn causes the tape 68 to be pulled to rotate the reel 64 in a counterclockwise direction and in opposition to the biasing force of the tension spring 28. As the reel 64 is rotated in a counterclockwise direction the wiper 12 is caused to be moved through its outboard stroke. The rate of speed at which the piston 40 is caused to be moved to effectuate movement of the wiper 12 through its outboard stroke is determined by the size of the aperture or bleed orifice 49. As the piston 40 is moved toward the left and the reel 64 rotated in a counterclockwise direction the lower portion 68b of the tape 68 will be wrapped around the peripheral surface portion 65b of the reel 64 and then be received in the slot 70, as shown in FIG. 3.

When the wiper 12 has been moved through its outboard stroke and vacuum pressure is no longer applied to the chamber 43 on the left side of the piston 40, the spring 28 will move the wiper 12 through its return or inboard stroke towards its park position. That is, the spring means 28 will cause the reel 64 to be rotated in a clockwise direction which in turn causes the tape 68 to move the piston 40 toward the right. The rate of speed of the return movement of the wiper is dependent upon the size of the bleed orifice 49.

The washer unit 30 for squirting washing fluid against the outer surface of the tailgate window 20 and in the path of movement of the wiper 12 is shown schematically in FIG. 1 of the drawing. It comprises a reservoir 80 for containing a supply of washing fluid. The reservoir 80 is in communication with an inlet 81a of a pump 81, which comprises part of the combined pump and control means 10, via a conduit 82. The pump 81 also has an outlet 81b which is in communication with the washer nozzles 31 via a conduit means 84. The pump 81 when manually actuated is operable to discharge a charge of washing fluid through the nozzles 31 in jet form against the window. The pump 81 upon being released draws a charge of washing fluid therein.

In accordance with the provisions of the present invention, the novel, combined pump and control means 10 is provided for controlling operation of the wiper and washer units. The combined pump and control means 10 comprises a housing 100 having an axially extending opening 102. The housing 100 is adapted to be mounted on a panel 103 such as the instrument panel of the vehicle 11. The opening 102 has, proceeding from right to left, as viewed in FIG. 5, first, second, third, fourth and fifth diameter portions 102a – 102e and with each succeeding diameter portion being of a larger diameter than the next preceding diameter portion. The housing 100 also has an inlet or inlet port 104 in communication with the diameter portion 102b of the opening 102 and an outlet or outlet port 106 in communication with the diameter portion 102c of the opening 102.

Figure 5:
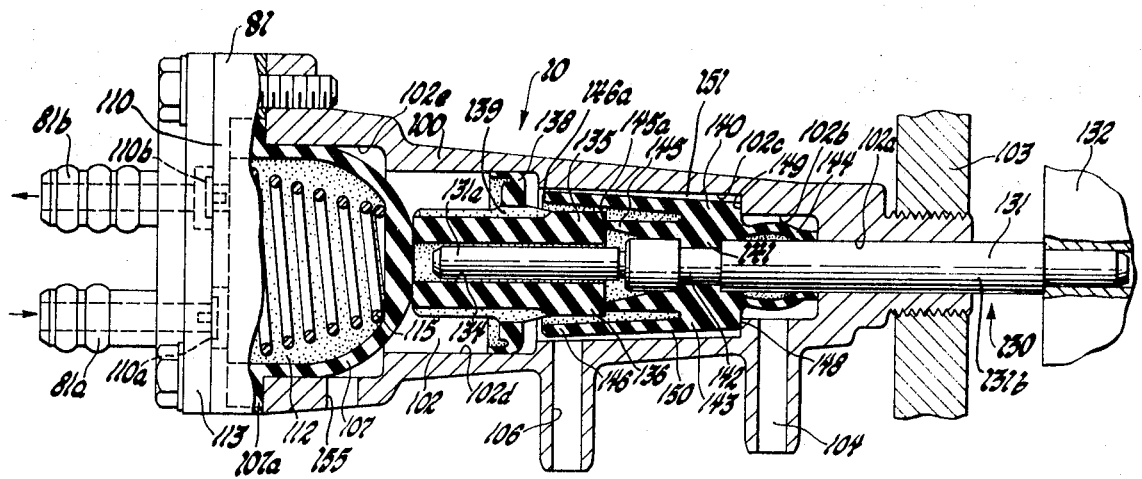
FIG. 5 is an enlarged cross-sectional view of part of the window cleaning system shown in FIG. 1.

The housing 100 at its left end carries the pump 81. The pump 81 comprises a resilient cup-shaped pumping element 107 made from a suitable resilient material, such as rubber, and whose outer periphery 107a is clamped against the left end of the housing 100 by an end cap 113 and valve assembly 110. The valve assembly 110 carries suitable one-way check valves 110a and 110b for allowing fluid to flow from the reservoir 80 toward the pump 81 and from the pump 81 toward the nozzles 31, but not vice versa. The pumping element 107 is disposed within the opening portion 102e of the housing 100 and defines with the valve assembly 110 a chamber 112 which is in communication with the inlet 81a of the pump 81 and which is in communication with the outlet 81b of the pump 81. The pumping element 107 is inherently biased toward its expanded position, as shown in FIG. 5, by a compression spring 115. The compression spring 115 has one end in abutting engagement with the valve assembly 110 and its other end in abutting engagement with the bottom of the cup-shaped pumping element 107.

The pumping element 107 is adapted to be depressed or collapsed during its discharge stroke and expanded during its intake stroke. When the pumping element expands through its intake stroke to the position shown in FIG. 5, washer fluid will be drawn from the reservoir 80 via conduit 82, inlet 81a and past the check valve 110a into the pump chamber 112. When the pumping element 107 is depressed washer fluid in the pump chamber will be forced out past the check valve 110b through the outlet 81b and thence via the conduit means 84 to the washer nozzles 31.

The pumping element 107 is adapted to be depressed through its discharge stroke by an actuating means 130. The actuating means 130 comprises a metal actuator rod 131 which extends through the opening portion 102a and is slidably supported by the housing 100. Secured to the rod 131 at its right end is a knob 132 which is adapted to be depressed toward the panel 103 by the operator using his finger or hand. The rod 131 at its forward end 131a is loosely received within a central through opening 134 of a first plunger or plunger means 135. The plunger 135 has a body portion 136 and an annular radially extending flange or piston portion 138 which is slidably received within the opening portion 102d of the housing 100. The body portion 136 at its forward end engages the pumping element 107 and is biased to the position shown in FIG. 5 by the pumping element 107 and spring 115. The first plunger 135 also has a plurality of openings 139 therethrough to provide communication between the opening portions 102c and 102d.

The rod 131 also carries a second annular plunger or plunger means 140 which is serially arranged with respect to the first plunger 135. The plunger 140 has a central through opening through which the forward portion 131a of the rod 131 extends and has a radially inwardly extending portion 141 which is received within an annular recess 142 in an enlarged diameter, rearward portion 131b of the rod 131 to securely retain the plunger 140 on the rod 131. The plunger 140 has a main body portion 143 and an annular, rearwardly extending, resilient flange 144 for sealingly engaging the rearward portion of the rod 131 and for sealingly engaging the housing 100 at the bottom of the opening portion 102b, as shown in FIG. 5.

The plunger 140 has an inner, annular resilient skirt or flange portion 145 and a radially spaced, outer, annular deflectable skirt or flange portion 146 which surrounds the rearward end of the first plunger means 135. The resilient skirt portion 145 is laterally deflectable or bowable and at its forward end 145a engages the body portion 136 of the first plunger 135. The skirt portion 145 has a radial thickness which progressively increases proceeding from its forward end 145a toward its rearward end. The outer, deflectable skirt portion 146 normally has its forward end spaced rearwardly from the flange 138 of the first plunger 135. The first plunger 135 is preferably made from a suitable rubber or plastic material. The second plunger 140 is preferably made or extruded from a dual hardness rubber material and with the outer skirt portion 146 being of a harder rubber than the remaining portions, which are elastic or resilient.

The second plunger 140 is normally biased to the position shown in FIG. 5 in which its annular radially extending surface 148 at the rearward end of its body portion 143 engages an annular, radially extending shoulder 149 formed at the junction of the opening portions 102b and 102c. When in this position communication between the inlet and outlet ports 104 and 106 is blocked to prevent vacuum pressure from being applied to the fluid motor 27. The plunger 140 has an outer peripheral surface 150 along the outer skirt and body portions 146 and 143 which is slightly tapered so that its diameter progressively decreases proceeding from its forward end toward its rearward end so as to provide an annular clearance space 151 between the plunger 140 and the housing 100.

Figure 6:
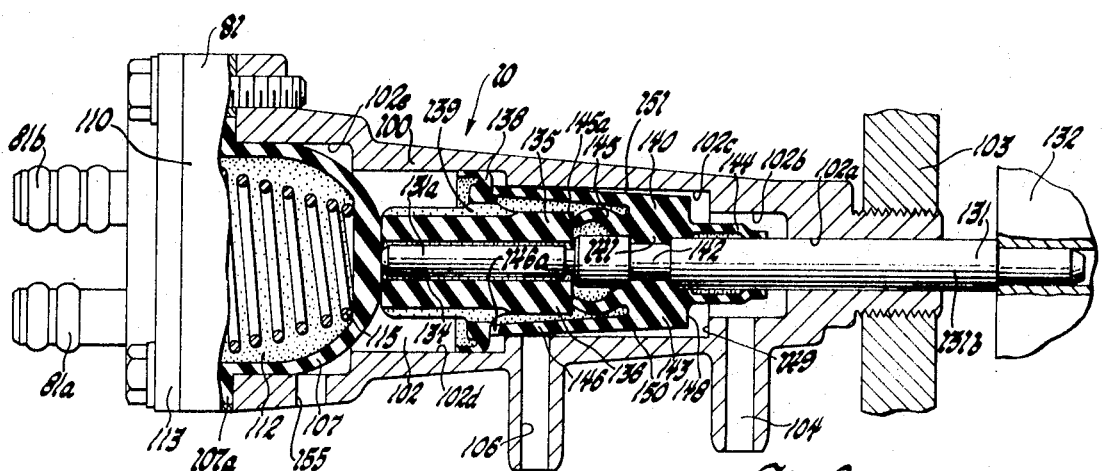
FIGS. 6 and 7 are views similar to that shown in FIG. 5 but showing different parts thereof in different positions.
Figure 7:
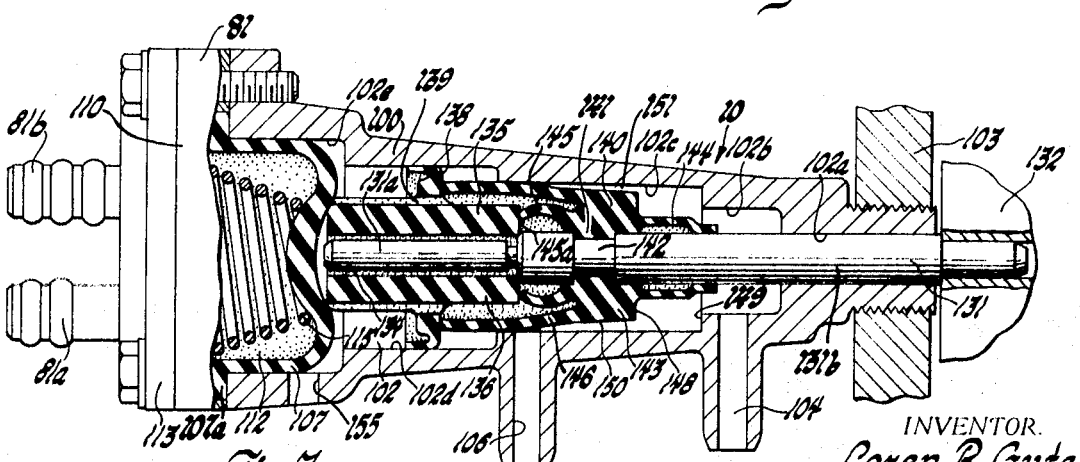

The second plunger 140 is movable between first, second and third positions. When in its first position, as shown in FIG. 5, the radially extending surface or shoulder 148 abuts the shoulder 149 at the junction of the opening portions 102b and 102c to block communication between the inlet and the outlet 104 and 106. When the plunger 140 is in either its second or third position, as shown in FIGS. 6 and 7, respectively, it unblocks communication between the inlet and the outlet 104 and 106, which in turn communicates vacuum pressure to the head end chamber 43 of the fluid motor 27 to cause the wiper 12 to be moved through its outboard stroke, and in a manner hereinbefore described. The second plunger 140 thus serves a valve means.

The second plunger 140 is adapted to be moved from its first position towards its second or third position in response to partial and full depression of the knob 132 towards the panel 103 by the operator. As the plunger 140 is moved towards its second position, as shown in FIG. 6, the annular skirt portion 145 will bow or buckle outwardly while the first plunger 135 remains stationary to allow the plunger means 140 to be moved forwardly to unblock communication between the ports 104 and 106. The resistance force of the skirt portion 145 is less than the biasing force of the compression spring 115 and thus, the plunger 140 will move relative to the plunger 135, the forward portion of the rod 131 sliding freely within the plunger 135. Also, during the movement of the plunger 140 toward its second position the annular skirt 146 adjacent its forward end 146a will contact the flange of plunger 135 thus providing a seal to block communication between the outlet port 106 and the atmosphere. The opening portion 102c is normally in communication with the atmosphere via openings 139 in the first plunger 135 and a port 155 in the housing 100 at the opening portion 102e.

Further inward movement of the first plunger 140 from its second position, as shown in FIG. 6, towards its third position, as shown in FIG. 7, causes the first plunger 135 to be moved toward the left to depress the pumping element 107 and discharge washer fluid from the pump chamber 112 to the washer nozzle 31. This movement of the first plunger 135 occurs primarily because when the plunger 140 reaches its second position, as shown in FIG. 6, a shoulder or shoulder means 156 (not shown) at the juncture of the diameter portions 131a and 131b of the actuator rod 131 engages the body portion 136 of the first plunger 135. This forward movement of the plunger 135 causes the pumping element 107 to be collapsed or depressed to expel washer fluid from the pump chamber 112. Also, the forward end 146a of the outer skirt 146 sealingly engages the piston portion 138 of the first plunger 135 during movement of the second plunger 140 from its second position toward its third position to block communication between the outlet port 106 and the atmosphere via port 155. The annular skirt 146 of the plunger 140 also aids in moving the first plunger 135 forwardly upon engagement therewith.

When the knob 132 is released the spring 115 will return the pumping element 107 towards its normal position, as shown in FIG. 5, which in turn causes the first plunger 135 to be moved toward its normal position, as shown in FIG. 5. The second plunger 140 is caused to be moved towards its first position, as shown in FIG. 5, by the first plunger 135 and resilient annular skirt portion 145 which functions as a spring means. When the plunger 140 is returned to its first position, as shown in FIG. 5, the shoulder 148 engages the shoulder 149 on the housing 100 to block communication between the ports 104 and 106. When this occurs the forward end portion of the outer skirt 146 returns toward its normal undeflected position. This establishes communication between the outlet port 106 and the atmosphere, via openings 139 in the plunger 135 and port 155, and hence communicates the head end chamber 43 of the fluid motor 26 with the atmospheric pressure. When this occurs the spring 28 will move the wiper 12 through its inboard stroke and the piston 40 of the fluid motor 26 from its position shown in FIG. 3 to its position shown in FIG. 2.

From the foregoing, it can be seen that a novel combined manually manipulatable pump and control means has been provided which is of a relatively simple, compact and economical construction and which functions when partially depressed to effect wiper operation alone or when fully depressed to effect conjoint operation of the wiper and washer units. Moreover, the design of the window cleaning system is such that upon full depression of the actuating means 130 of the combined pump and control means 10, washer fluid is squirted against the outer surface of the tailgate window prior to the wiper being moved through its outboard stroke. This insures that washer fluid has wetted the window prior to the wiping action so as to minimize loading the wiper and to provide for maximum cleaning.

Although the illustrated embodiment hereof has been described in great detail, it should be apparent that certain modifications, changes, and adaptations may be made in the illustrated embodiment, and that it is intended to cover all such modifications, changes and adaptations which come within the spirit of the present invention.

What is claimed is:

1. A combined manually actuatable washer pump and control means for controlling operation of a washer and wiper unit of a window cleaning system for an automotive vehicle comprising: a housing which is adapted to be mounted on the vehicle; a pump means carried by the housing, said pump means including an inlet, an outlet and a pumping element movable in opposite directions between first and second positions, said pumping element being biased towards its first position and when moved towards its first position being adapted to draw a charge of washer fluid within the pump means; a first plunger means slidably supported for movement in opposite directions between first and second positions by said housing, said first plunger being engageable with said pumping element and being in its first position when the pumping element is in its first position; said housing having an inlet and an outlet at spaced locations and which are adapted to be connected with a source of fluid pressure and a fluid motor of the wiper unit; second plunger means supported for movement in opposite directions between first, second and third positions, an actuator connected with said second plunger means, said second plunger means blocking communication between said inlet and outlet when in its first position and unblocking communication therebetween when in its other positions, said second plunger means including a spring means in engagement with said first plunger means, said spring means being deflectable while said first plunger means remains in its first position when said second plunger means is moved from its first position towards its second position to unblock communication between said inlet and outlet and at least one of said actuator and second plunger means being engageable with said first plunger means to move the latter from its first position towards its second position to cause the pumping element to discharge washer fluid when the second plunger means is moved form its second position towards its third position whereby said combined washer pump and control means can be operated to effect wiper operation alone or conjoint wiper and washer operation.

2. A combined manually actuatable washer pump and control means for controlling operation of a washer and wiper unit of a window cleaning system of an automotive vehicle comprising: a housing which is adapted to be mounted on the vehicle; a pump means carried by the housing, said pump means including an inlet, an outlet and a pumping element movable in opposite directions between first and second positions, said pumping element being biased towards its first position and when moved towards its first position being adapted to draw a charge of washer fluid within the pump means; a first plunger means slidably supported for movement in opposite directions between first and second positions by said housing, said first plunger means being engageable with said pumping element and being in its first position when the pumping element is in its first position; said housing having an inlet port and an outlet port at spaced locations and which are adapted to be connected with a source of pressure fluid and the fluid motor of the wiper unit; and actuator slidably supported by said housing; second plunger means connected with said actuator and being movable with the actuator in opposite directions between first, second and third positions, said second plunger means blocking communication between said inlet and outlet ports when in its first position and unblocking communication therebetween when in its other positions, said second plunger means having a forwardly extending resilient skirt portion in engagement with said first plunger means, said resilient skirt portion biasing said second plunger means towards its first position and being laterally deflectable when the actuator and second plunger means are moved from their first position towards their second position to unblock communication between said inlet and outlet ports, said actuator being engageable with said first plunger means to move the latter from its first position towards its second position to cause the pumping element to discharge washer fluid when it and the second plunger means are moved from their second position towards their third position whereby said combined control means can be operated to effect wiper operation alone or conjoint wiper and washer operation.

3. A combined manually actuatable washer pump and control means for controlling operation of a washer and wiper unit of a window cleaning system for an automotive vehicle comprising: a housing which is adapted to be mounted on the vehicle; a pump means carried by the housing, said pump means including an inlet, an outlet and a manually depressible pumping element which is deflectable in opposite directions between first and second positions, said pumping element being biased towards its first position and when moved toward its first position being adapted to draw a charge of washer fluid within the pump means; a first plunger slidably supported for movement in opposite directions between first and second positions by said housing, said first plunger means having a body portion which is engageable with said depressible pumping element and an annular flange portion whose outer periphery is in engagement with said housing, said first plunger means being in its first position when said pumping element is in its first position, said housing having an inlet port and an outlet port at spaced locations and which are adapted to be connected with a source of fluid pressure and a fluid motor of the wiper unit; an actuator rod slidably supported by said housing; second plunger means connected with said actuator rod for movement therewith in opposite directions between first, second and third positions, said housing having a third port in communication with the atmosphere and said first plunger means having an opening therethrough, said second plunger means blocking communication between said inlet and outlet ports and unblocking communication between said third port and outlet port when in its first position and unblocking communication between said inlet and outlet ports and blocking communication between said third and outlet ports when in its other positions; said second plunger means having an annular, inner, resilient skirt portion in engagement with said body portion of said first plunger means and an annular, outer, deflectable skirt portion whose forward end is spaced from said flange of said first plunger means when said second plunger means is in its first position, said inner resilient skirt portion being laterally bowable while said first plunger means remains in its first position when said second plunger means is moved from its first position towards its second position to unblock communication between said inlet and outlet ports, said outer skirt portion being outwardly deflectable to sealingly engage said housing when communication between said inlet and outlet is established and to block communication between said outlet port and third port, said actuator having a shoulder which engages said first plunger means to move the first plunger means from its first position toward its second position to cause the pumping element to be depressed to discharge washer fluid when said actuator and second plunger means are moved from their second position toward their third position, said outer annular skirt portion sealingly engaging said flange of said first plunger means to maintain communication between the outlet port and third port blocked when said actuator and second plunger means are moved from their second position towards their third position whereby said combined control means can be operated to effect wiper operation alone or conjoint wiper and washer operation.

4. In a window cleaning system for cleaning a rear window of an automotive vehicle and having a wiper unit including an oscillatory wiper which is moved during each cycle of operation through its outboard stroke by a fluid motor in response to a source of fluid pressure being communicated thereto and through its inboard stroke by a spring means when fluid pressure is no longer communicated to the fluid motor and a washer unit including a supply of washer fluid and washer nozzles for squirting the washer fluid onto the window, the improvement comprising a combined manually actuatable washer pump and valve control means for controlling operation of the washer and wiper unit, said combined manually actuatable pump and valve control means comprising a housing which is adapted to be mounted on the vehicle; a pump means carried by the housing, said pump means including an inlet, an outlet and a manually depressible pumping element which is deflectable in opposite directions between first and second positions, said pumping element being biased towards its first position and when moved toward its first position being adapted to draw a charge of washer fluid within the pump means; a first plunger slidably supported for movement in opposite directions between first and second positions by said housing, said first plunger means having a body portion which is engageable with said depressible pumping element and an annular flange portion whose outer periphery is in engagement with said housing, said first plunger means being in its first position when said pumping element is in its first position, said housing having an inlet port and an outlet port at spaced locations and which are adapted to be connected with the source of fluid pressure and the fluid motor of the wiper unit; an actuator rod slidably supported by said housing; second plunger means connected with said actuator rod for movement therewith in opposite directions between first, second and third positions, said housing having a third port in communication with the atmosphere and said first plunger means having an opening therethrough, said second plunger means blocking communication between said inlet and outlet ports and unblocking communication between said third port and outlet port when in its first position and unblocking communication between said inlet and outlet ports and blocking communication between said third and outlet ports when in its other positions; said second plunger means having an annular, inner, resilient skirt portion in engagement with said body portion of said first plunger means and an annular, outer, deflectable skirt portion whose forward end is spaced from said flange of said first plunger means when said second plunger means is in its first position, said inner resilient skirt portion being laterally bowable while said first plunger means remains in its first position when said second plunger means is moved from its first position towards its second position to unblock communication between said inlet and outlet ports, said outer skirt portion being outwardly deflectable to sealingly engage said housing when communication between said inlet and outlet is established to block communication between said outlet port and third port, said actuator having a shoulder which engages said first plunger means to move the first plunger means from its first position toward its second position to cause the pumping element to be depressed to discharge washer fluid when said actuator and second plunger means are moved from their second position toward their third position, said outer annular skirt portion sealingly engaging said flange of said first plunger means to maintain communication between the outlet port and third port block when said actuator and second plunger means are moved from their second position towards their third position whereby said combined control means can be operated to effect wiper operation alone or conjoint wiper and washer operation.

* * * * *